July 22, 1969  F. C. HUTTO  3,456,953
PISTON RING ASSEMBLY
Filed Jan. 19, 1967
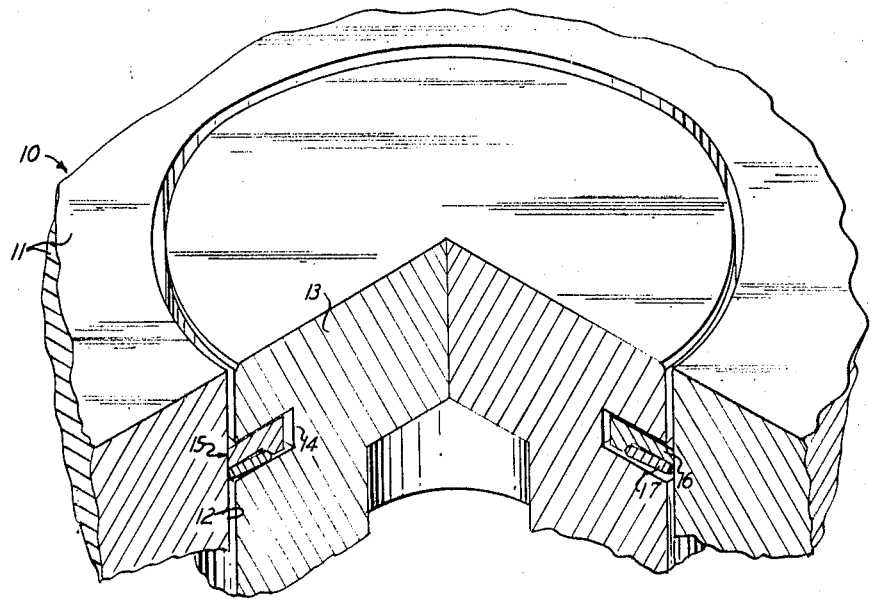
FIG. 1
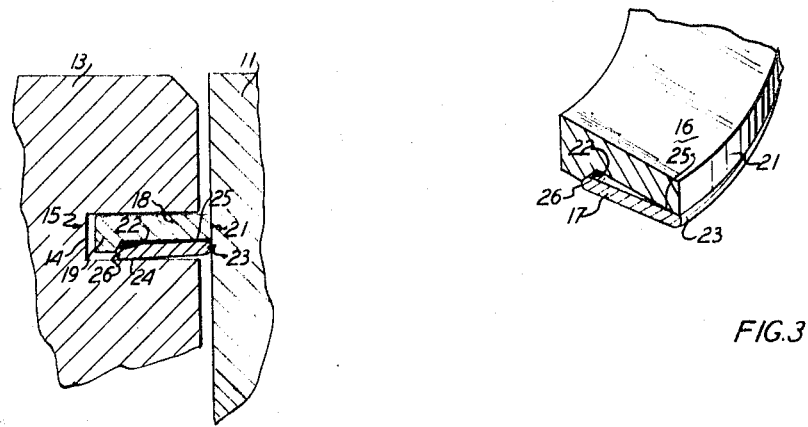
FIG. 2
FIG. 3
FRANK C. HUTTO
INVENTOR.
BY
ATTORNEYS United States Patent Office 3,456,953
Patented July 22, 1969

3,456,953
PISTON RING ASSEMBLY
Frank C. Hutto, Dearborn, Mich., assignor to Ford Motor Company, Dearborn, Mich., a corporation of Delaware
Filed Jan. 19, 1967, Ser. No. 610,286
Int. Cl. F16j 15/00; F02f 5/00; K16k 41/00
U.S. Cl. 277—143                    5 Claims

ABSTRACT OF THE DISCLOSURE

An internal combustion engine piston ring assembly comprising a compression ring element having a conical flange that wedges an oil control rail element or other relatively thin element axially downwardly and radially outwardly.

---

Internal combusion engines commonly employ two different types of piston rings, viz., compression rings and oil control rings. These rings most commonly appear in separate grooves or, at times, in a single groove separated by an expander-spacer. Such construction requires a considerably larger ring belt than does the invention that is described in the following paragraphs. A minimum ring belt distance is often desired to reduce piston height and weight and to achieve a low compression ratio.

The invention provides a plural element piston ring assembly in a single groove without the necessity of an intermediate expander-spacer.

It is an object of this invention to provide a combination compression and oil control ring assembly that is easy to manufacture and assemble in the ring groove, and is dependable in operation.

An additional object of the invention is to provide a ring assembly with the advantages of a plated or special alloy compression ring, but costing less, by utilizing a compression ring element of conventional low cost material in combination with a relatively small or thin element of the special alloy or having the special plating.

Another object of the invention is to provide a combination compression and oil control piston ring assembly that has axial flexibility to compensate for ring groove waviness.

An additional object is to provide a piston ring assembly that is axially loaded to form a compression seal on both the upper and lower sides of the piston ring groove. Still another object is to provide a simplified piston ring assembly construction where radial and side unit pressures may be varied by changing the angle of a beveled face on the compression ring element.

Another object of the invention is to provide a ring assembly which, when combustion pressure escapes to the inner area of the compression ring element, the radially outward forces exerted by the pressure against the compression ring element produce corresponding axial forces that seal the second element or rail element even more tightly against the ring groove lower side and thereby reduce blowby.

Another object is to provide a two element piston ring assembly, a larger first element of the assembly being of a conventional compression ring material to provide a rapidly seating element, and a smaller second element being of a material with greater wear resistant properties to provide a leading edge slidably sealing the cylinder bore.

A further object of the invention is to provide a piston ring assembly having a compression ring type first element and a second element, the first element biased radially outwardly and bearing against the cylinder bore and having a beveled face that wedges the second element radially outwardly and axially toward the adjacent side of the ring groove.

Other objects, features and advantages of the invention will become apparent upon reference to the following detailed description thereof, and to the accompanying drawings in which:

FIGURE 1 is a perspective view, with parts broken away and in section, of portions of an internal combustion engine cylinder block, piston and piston ring assembly embodying the invention;

FIGURE 2 is an enlarged cross-sectional view of the piston ring assembly of FIGURE 1; and FIGURE 3 is a perspective view, with parts broken away and in section, of the piston ring assembly.

FIGURE 1 shows a portion 10 of an internal combustion engine having a cylinder block 11 formed with a bore 12 that slidably receives a piston 13. Piston 13 is formed with a ring groove 14 in which is inserted a piston ring assembly 15. Although not shown, the ring assembly 15 would be of the conventional split ring type to permit its assembly into ring groove 14 under compression and to cause the rings to bear resiliently against cylinder bore 12 during engine operation.

Piston ring assembly 15 consists of two elements, a first element or compression ring element 16 and a second element or oil control rail element 17. Compression ring element 16, preferably made of cast iron, is essentially L-shaped in cross section, with a rectangular-like body portion 18 and a downwardly projecting rail-element-engaging flange portion 19. The body portion has a cylindrical bore-engaging fact 21, while flange portion 19 has a conical or annular, beveled, wedge-like face 22. Rail element 17, preferably made of chrome plated steel, is of conventional oil rail design, and has a radial cross-sectional width of not more than the difference of the compression ring outer radius and the conical face minor radius, and of not less than the difference of the compression ring outer radius and the conical face major radius. Rail element 17 is confined at its outer surface 23 by cylinder bore 12, at its underside 24 by the lower side of ring groove 14, at its upper side 25 by the underside of the compression ring element 16, and at its inner surface 26 by conical face 22.

In operation, the compression ring element 16 is resiliently urged radially outwardly into sliding contact at face 21 with cylinder bore 12, and at the same time its beveled face 22 bears in a wedge-like manner against the inner surface 26 of rail element 17. Radially outward displacement of face 22 wedges the underside 24 of rail element 17 downwardly into contact with the lower side of ring groove 14, and displaces the outer surface 23 of rail element 17 radially outwardly into contact with the cylinder bore 12.

In summary, it may be noted that the piston ring assembly 15 seals cylinder bore 12 at the compression ring element face 21 and at the rail element outer surface 23. In addition, the axially widening bias of assembly 15, resulting from the axially displacing wedge action between elements 16 and 17, causes the assembly 15 to seal both the upper and lower sides of ring groove 14.

In place of a steel rail element, a similarly shaped cast alloy lower element may be used. The principles of operation, when the cast alloy lower element is used, are the same as when the conventional oil rail is used.

It will be understood that this invention is not to be limited to the exact construction shown and described but that various changes and modifications may be made without departing from the spirit and scope of the invention as defined in the appended claims.

I claim:
1. In an internal combustion engine having a cylinder bore slidably receiving a piston therein, and a ring groove in said piston, the invention comprising a piston ring assembly in said ring groove comprising a compression ring type first element biased radially outwardly into engagement with said cylinder bore, a second element having a surface contacting said cylinder bore, said first element having a beveled face portion slidably engaging a generally radial inner portion of said second element and wedging said second element radially outwardly and axially against the adjacent side of said ring groove said second element having a second portion engaging a second portion of said first element.

2. In an internal combustion engine having a cylinder bore slidably receiving a piston therein, and a ring groove in said piston, the invention comprising a piston ring assembly in said ring groove comprising a rail element having a surface contacting said cylinder bore and a radially outwardly expanding compression ring element having a first face contacting said cylinder bore and a beveled face portion slidably engaging a generally radial inner portion of said rail element, said beveled face portion wedging said radial inner portion of said rail element radially outwardly and axially toward the adjacent side of said ring groove said rail element having a second portion engaging a second portion of said compression ring element.

3. In an internal combustion engine having a cylinder bore slidably receiving a piston therein, and a ring groove in said piston, the invention comprising a piston ring assembly in said ring groove comprising a rail element and a radially outwardly biased compression ring element, said compression ring element having an axially extending flange having a beveled face portion engaging a generally radial inner portion of said rail element in a manner to wedge said rail element radially outwardly against said cylinder bore and axially against the side of said ring groove said rail element having a second portion engaging a second portion of said compression ring element.

4. In an internal combustion engine having a cylinder bore slidably receiving a piston therein, and a ring groove in said piston, the invention comprising a variable width piston ring assembly in said ring groove contacting the upper and lower sides of said ring groove, said piston ring assembly comprising a compression ring element biased radially outwardly into engagement with said bore, a rail element having an outer surface engagable with said bore and an inner surface, said compression ring element having an axially downwardly extending flange adjacent its inner edge, said flange having a radially outward face inclined relative to the axis of said compression ring element slidably engaged with said inner surfaces of said rail element to wedge said rail element into contact at its outer surface with said cylinder bore and at its underside with the lower side of said ring groove.

5. A piston ring assembly according to claim 2 and including:
    said beveled face comprising a conical surface having a major radius and a minor radius,
    said rail element having a radial cross sectional width of not more than the difference of the compression ring element outer radius and the conical surface minor radius, and of not less than the difference of the compression ring element outer radius and the conical face major radius.

References Cited

UNITED STATES PATENTS

| | | | |
|---|---|---|---|
| 2,506,099 | 9/1936 | Grimm | 277—190 X |
| 2,082,056 | 6/1937 | Hodge | 277—144 |
| 2,589,106 | 3/1952 | Marien | 277—195 |

SAMUEL ROTHBERG, Primary Examiner

U.S. Cl. X.R.

277—194